United States Patent [19]
Chiodo

[11] Patent Number: 5,370,843
[45] Date of Patent: Dec. 6, 1994

[54] PIPETTE PULLER

[75] Inventor: Chris Chiodo, Warren, Mich.

[73] Assignee: ASI Instruments, Inc., Warren, Mich.

[21] Appl. No.: 120,055

[22] Filed: Sep. 13, 1993

[51] Int. Cl.$^5$ ............................................. C03B 23/11
[52] U.S. Cl. ...................... 422/99; 422/104; 65/108; 65/270; 65/276; 65/292
[58] Field of Search ................ 422/99, 100, 104; 65/283, 276, 280, 292, 270, 108, 110, 87

[56] References Cited

U.S. PATENT DOCUMENTS

| | | | |
|---|---|---|---|
| 3,498,771 | 3/1970 | Bird et al. | 65/283 |
| 4,092,142 | 5/1978 | Dichter | 65/159 |
| 4,111,677 | 9/1978 | Andrews | 65/271 |
| 4,121,920 | 10/1978 | Balkwill | 65/13 |
| 4,226,607 | 10/1980 | Domken | 65/105 |
| 4,530,712 | 7/1985 | Kopf | 65/270 |
| 4,606,424 | 7/1986 | Flaming | 65/29 |
| 4,981,505 | 1/1991 | Männl | 65/152 |
| 5,174,803 | 12/1992 | O'Brien, Jr. | 65/271 |

Primary Examiner—James C. Housel
Assistant Examiner—Long V. Le
Attorney, Agent, or Firm—James Creighton Wray

[57] ABSTRACT

A pipette puller has a heater coil X-Y position controlled by two knobs. The coil can be vertically positioned along a pipette by moving a third knob for the Z positioning. A dual-heat heat control provides two preset temperatures. A movable shield covers the coils when they are heated, eliminating accidental burnings. Sensors run the status panel. The panel tells when to start a pull, the position of the movable chuck, the position of the shield, and when to reposition the coil and indicates a primary stop between two burns of a patch electrode pull. A vertical rail supports all of the major mechanical moving parts, with the exception of the adjustable stop which swings in and out of operative position.

19 Claims, 4 Drawing Sheets

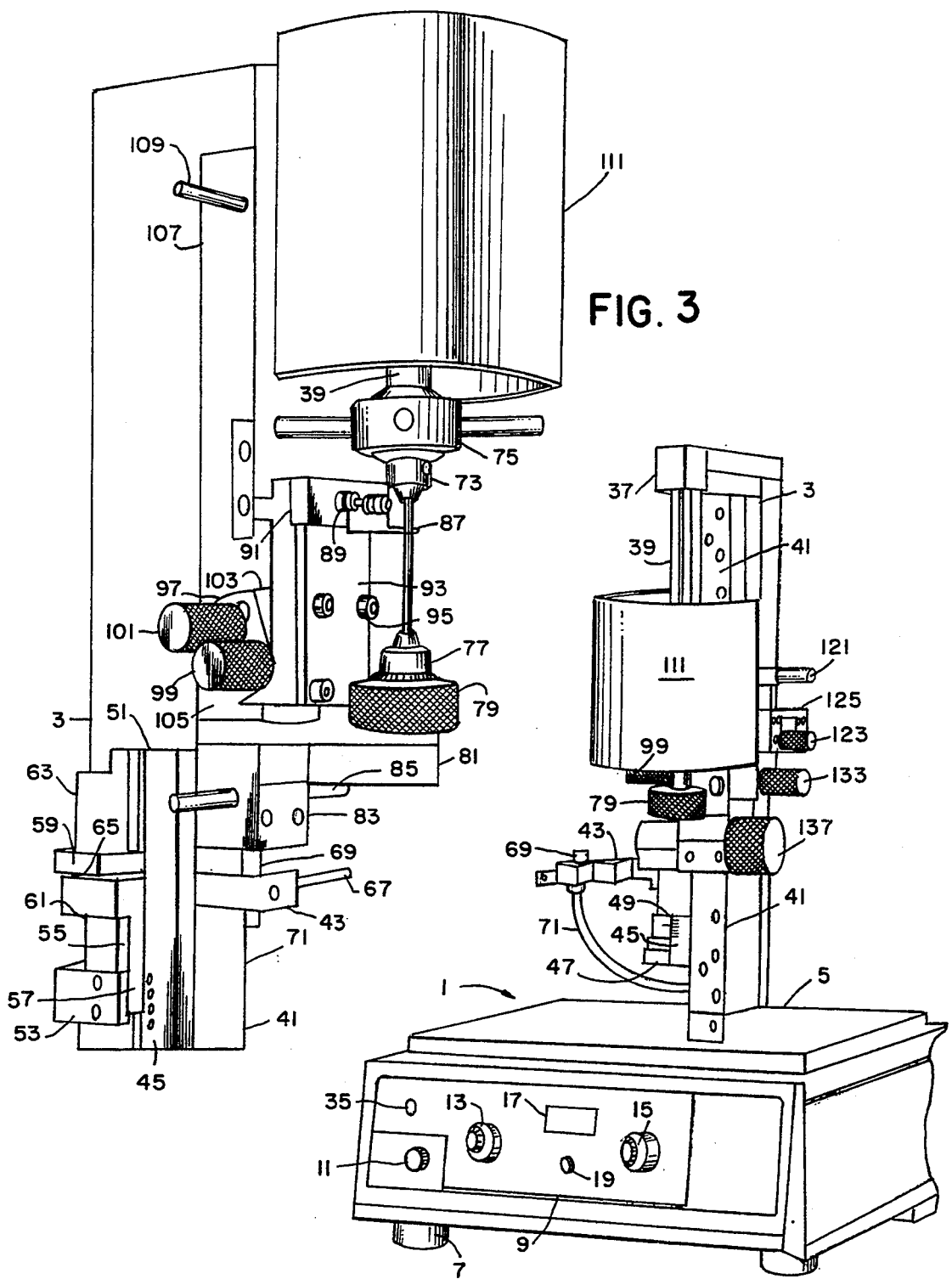

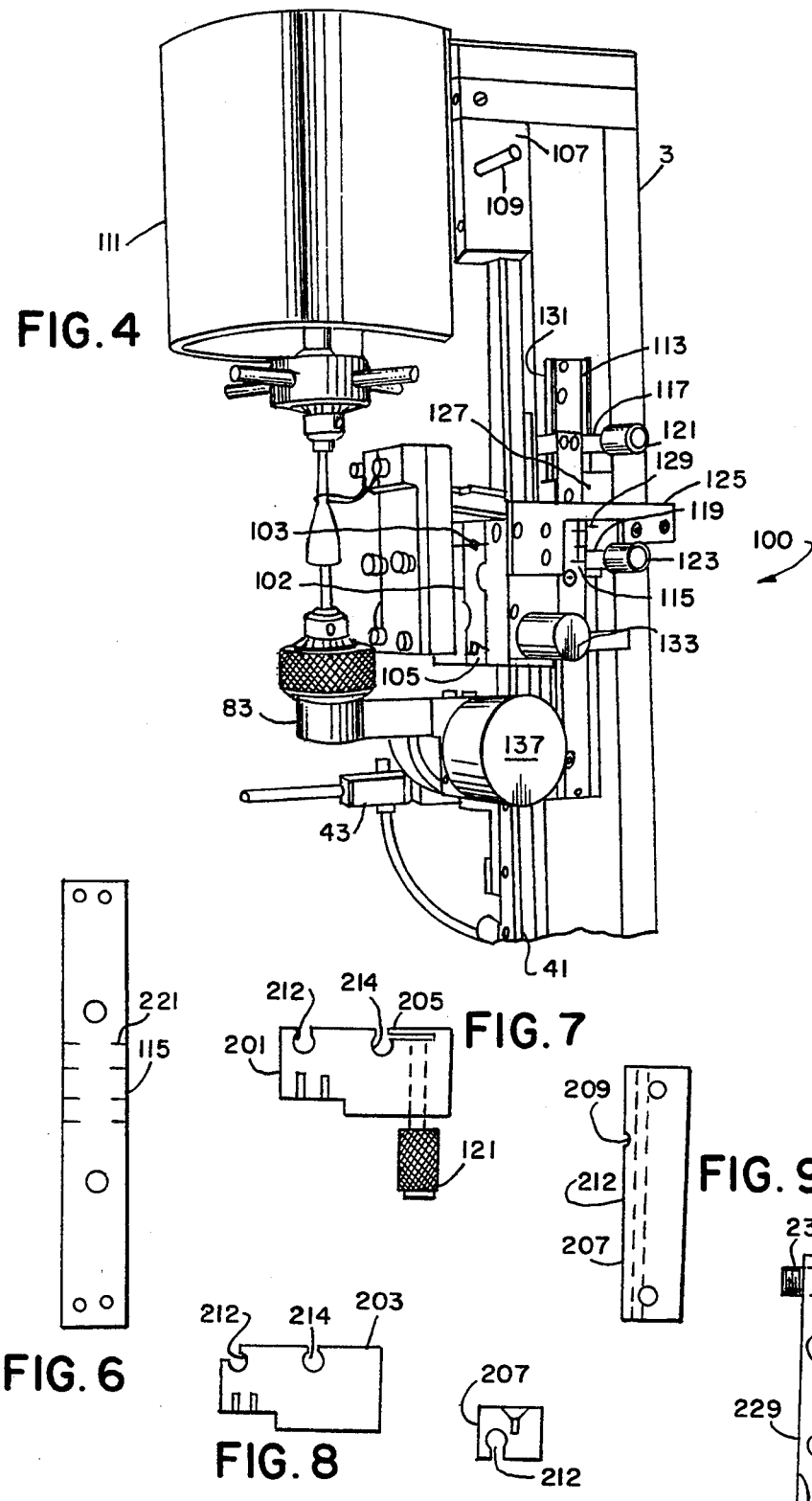

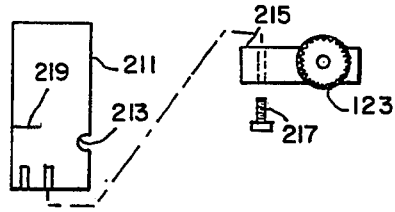
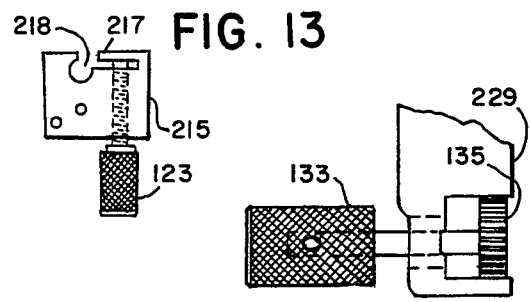
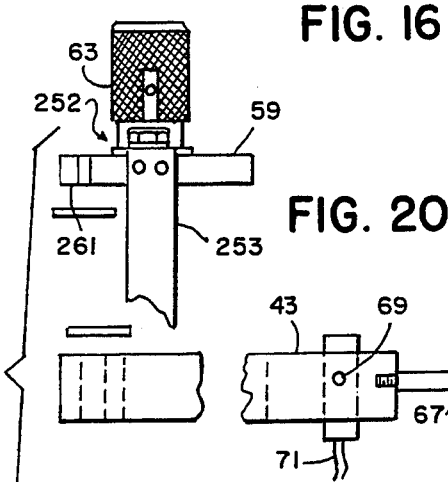
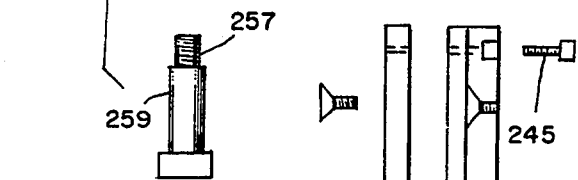
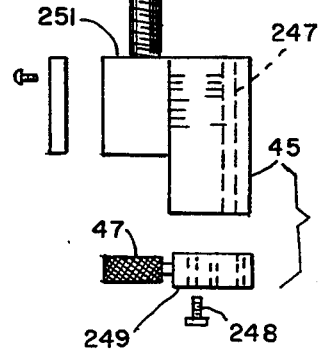
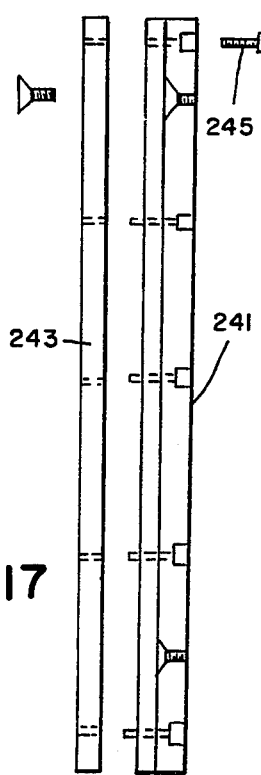
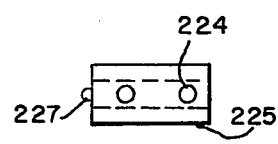

PIPETTE PULLER

BACKGROUND OF THE INVENTION

Pipette pullers draw glass or quartz tubing into micropipettes and multi-barrel pipettes by heating intermediate portions of the tubing to a predetermined temperature or temperatures, and pulling axially on the tubing which is supported between fixed and movable chucks.

While pipette pullers are well known, needs exist to improve the pipette pullers. Specifically needs exist for improved chucks and improved mounts for ensuring smooth movement between the chucks and other elements. Needs exist for precise heater adjustments to accommodate different size pipettes and to ensure precise heating. Needs exist for smooth heater movements and heater adjustments. Needs exist to provide simplified pipette pullers with simplified controls which are capable of providing precise pulling of varied tubes. Needs exist for precise repositioning of heaters in X, Y and Z directions, and for precise repositioning of heaters during pulling in Z directions.

Needs exist for easy to use and safe and accurate shieldings. Additional needs exist for replacement of fragile hot wires without touching the hot wires and causing them to break and drop hot fragments in unwanted positions.

The present invention solves long-standing needs of the prior art.

SUMMARY OF THE INVENTION

The pipette puller of the invention is designed to meet all pipette, multi-barrel pipette, patch and extracellular needs.

The pipette puller of the invention incorporates a DC constant-current source that provides up to 30 amps of power, allowing use of a wide range of coil materials and sizes.

The new pipette puller is packaged in an integrated puller tower and process controller, making it easy to use and compact.

The pipette puller is user-friendly and is able to meet demanding needs. This new pipette puller has been designed for scientists.

The superior design includes high grade aluminum and stainless steel construction, which ensures years of trouble-free operation. The linear bearing technology gives an accurate and smooth gravity feed, pull. The bayonet-style burning element holder eliminates the need to touch a fragile well-burned coil.

One element holder is pulled out and is replaced with another. Heat is reset and a pipette is pulled, all without touching a coil.

Any coil can be easily centered using two knobs, which provide X-Y movement of the coil housing.

Using the side mounted coil jog knob, one can vertically position the coil accurately along a pipette or length of glass in a Z axis movement. A two position jog can be set up for patch electrode fabrication.

The side-mounted coil jog knob eliminates the cumbersome technique of repositioning the glass between two sequential burns. In addition, one can easily dial in the length of the first pull using the calibrated, removable side-mounted primary stop that provides reproducible pull lengths as long as ten millimeters. Readability of the adjustment is one-fourth's of millimeters.

Patch electrode architecture is now placed under total control by the invention. Dual heat controls provide two pre-set temperatures which are available at the push of a button. Each control is a ten turn locking/calibrated dial for ease of use and repeatable accuracy. Simply pushing a button selects heat 1 or heat 2. An advisory lamp above the dial provides an alert that the heat control has been activated.

The dual heat control is particularly useful when fabricating patch electrodes, which typically use two different temperatures for the first and second pulls.

Upper and lower three jaw rotary chucks hold the pipette/electrode, allowing use of glass up to 4.0 mm in diameter. Combined with 30 amps of power and a three axis coil positioning system, the chucks provide easy, repeatable pulling of microionophoretic pipettes. The unique combination of the chucks, the 30 amps, and three axis coil positioning system provide wide usefulness of the invention.

Two removable weights are provided for the bottom, movable chuck assembly.

The pipette/electrode taper can be tailored to specific needs.

Advanced sensor technology protects the user and provides critical status data.

Because the coil can be heated only when the movable shield is in the down position, the coil cannot be accidentally touched while in use.

The sensor technology also runs the status panel, which tells when to start a pull, the position of the movable chuck, the position of the shield, and when to reposition the coil and primary stop between two burns of a patch electrode pull.

The new pipette puller pulls multi-barrel pipettes, patch electrodes and single barrel extracellular electrodes. Capital equipment costs are less.

The pipette puller of the invention is compact. Valuable bench space is saved.

Because of the adjustable vertical coil positioning, one need not reposition glass for two stage pulls during patch electrode construction.

The pipette puller has an innovative initial stop. Dialing in the length of the first pull achieves the desired shank taper for patch electrode fabrication.

Constant current circuitry with digital readout assures maintaining accurate heat settings.

The quick change coil, dual heat controls and calibrated locking control knobs provide increased productivity and enable fast, accurate and repeatable results.

In one example, the pipette puller of the invention has a height of 18.75 inches (47.62 cm), a width of 10.75 inches (27.30 cm) and a depth of 11.00 inches (27.94 cm). The distance between chucks is 5.00 inches (12.70 cm). The weight is 25 lbs or 11.3 kg. The pipette puller of the invention accepts input voltages of 47-63 Hz at 100 V, 120 V, 220 V, 230 V/240 V, and is fused at 1A.

A pipette puller has the following innovative features. Coil X-Y position is controlled by two knobs. The coil can be vertically positioned along a pipette by moving a third knob for the Z positioning. A dual-heat control provides two pre-set temperatures. A movable shield covers the coils when they are heated, eliminating accidental burnings. Sensors run the status panel. The panel tells when to start a pull, the position of the moveable chuck, the position of the shield, and when to reposition the coil and primary stop between two burns of a patch electrode pull. A vertical rail supports all of the mechanical parts.

A pipette puller has a base and a vertical mast. An upper support is cantilevered forward from the top of the vertical mast. A fixed three-jaw chuck is connected to the forward cantilevered support. A movable chuck support is connected to the rail and is slidable along the rail. A movable three-jaw chuck is connected to the movable chuck support in axial alignment with the fixed chuck. Handles extend outward from the movable chuck support. The handles are removable for receiving weights. A stop bracket is connected to the mast to the side of the movable jaw support. A stop adjuster screw is connected to the stop bracket and a stop plate is connected to the stop adjuster screw and extends outward from the mast beneath the movable chuck support for stopping downward movement of the movable chuck support. A heating guide is connected to the mast. A heater support is connected to the heater guide for vertical positioning along the heater guide. A first vertical heater adjustment is connected to the mast and the heater support for adjusting vertical position of the heater support. A heater carrier is connected to the heater support. An X adjustment screw is connected between the heater carrier and the heater support for moving the heater carrier laterally with respect to the heater support. A Y adjustment screw is connected between the heater support and the heater carrier for moving the heater carrier toward and away from the heater support. A heater wire coil is connected to the heater carrier and aligned axially with the fixed and movable three-jaw chucks. A slide is mounted on the rail, and a partially cylindrical shield is connected to the slide for moving upward and downward along the slide for uncovering and covering the heater coil and the fixed chuck.

The stop plate has a handle extending from the stop plate. the stop plate is mounted on a follower on the stop adjusting screw for swinging into position beneath the movable chuck support, and out of position at a side of the mast for allowing the movable chuck to slide toward a bottom of the rail.

The base comprises a process controller with a power switch for turning power on and off. A first heat adjuster adjusts a first heat, and a second heat adjuster adjusts a second heat. A display displays heat index of the heat selected. A selector selects the display of heat 1 or heat 2. Status indicator lights indicate power on, system ready, pulling, pull complete, reposition and shield open.

A contact sensor switch on the stop support senses contact of the movable chuck support with the stop support.

An adjuster plate is positioned between the heater support and the heater carrier. Slides are connected to the heater carrier and adjustment plate for sliding the heater carrier toward and away from the adjustment plate upon adjustment.

Slides are connected between the heater support and the adjustment plate for sliding the adjustment plate laterally with respect to the heater support.

A removable mount is connected between the heater wire and the carrier and supports the heater wire, and is removable from the carrier for interchanging heater wires and mounts without touching heater wires.

Upper and lower stops are mounted on the mast. A vertical rack is mounted on the mast. A pinion end is connected to the rack and a turn handle is connected to the pinion and to the heater support for moving the heater support and heater wire between the upper and lower limits.

These and further and other objects and features of the invention are apparent in the disclosure, which includes the above and ongoing written specification, with the claims and the drawings.

BRIEF DESCRIPTION OF THE DRAWINGS

FIG. 2 is a perspective view of the machine showing the base and mast with the shield in a lowered position.

FIG. 3 is a left side detail of the pipette puller.

FIG. 4 is a right side detail of the pipette puller.

FIG. 5 is a detail of a U-shaped guide base to which cylindrical guide rails are secured for attachment to the right side of the pipette puller.

FIG. 6 is a detail of a scale.

FIG. 7 is a top view of a scale clamp block.

FIG. 8 is a top view of a scale slide block.

FIG. 9 is a side elevation of a first stop block.

FIG. 10 is a bottom view of the first stop block shown in FIG. 9.

FIG. 11 is a side elevation of a second stop block.

FIG. 12 is a side elevation of a clamp block for the second stop block.

FIG. 13 is a top view of the clamp block shown in FIG. 12.

FIG. 15 is a side elevation of a gear housing with a pinion and detent.

FIG. 16 is a side elevation detail of the gear housing shown in FIG. 15.

FIG. 17 is a side elevational exploded view of a guide and rail.

FIG. 18 is a bottom view of the guide and rails shown in FIG. 17.

FIG. 19 is an exploded view of a patch clamp stop adjustment assembly.

FIG. 20 is a detail of the assembly shown in FIG. 19, with the addition of a sensor support arm.

DETAILED DESCRIPTION OF THE DRAWINGS

Figure 1:
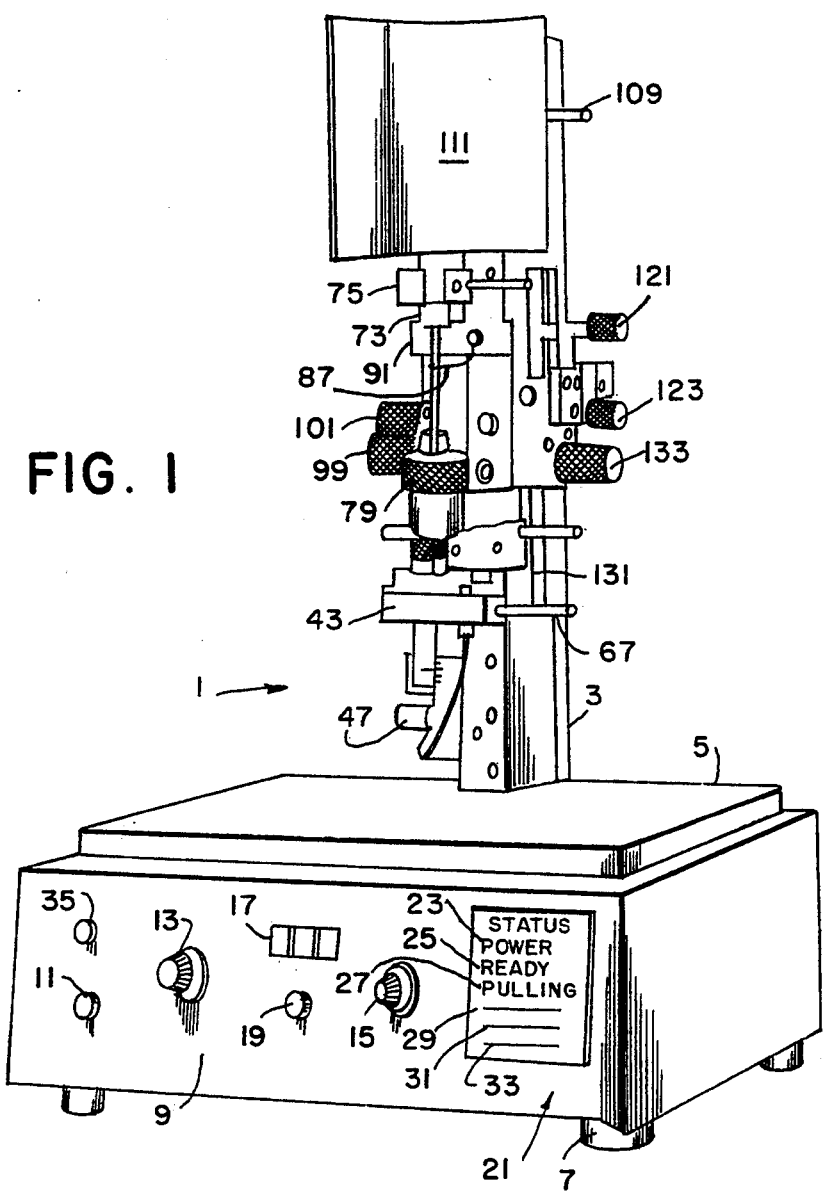
FIG. 1 is a perspective view of the machine showing the base and mast with the shield in a raised position.

Referring to FIG. 1, the pipette puller is generally indicated by the numeral 1. The pipette puller has a mast 3 mounted on a base 5. The base has four adjustable leveling legs 7, and a front face 9 on which the controls are mounted. Push button 11 controls the power. Heat adjuster 13 adjusts the first level of heating, and heat adjuster 15 adjusts the second level of heating. Display 17 shows current heat index. Push button 19 selects between heat control knobs 13 and 15. An indicator light above one control knob is on when that knob is selected. A row of status indicator lights 21 show power 23, ready 25, pulling 27, reposition 29, pull complete 31, and shield open 33 indications.

A start button 35 starts the pulling.

As shown in FIG. 2, the mast 3 has a forward cantilevered upper support 37, which supports a rigid tube 39 on which a fixed chuck is mounted. A rail 41 is secured along the front of the mast. The major moving parts, the movable chuck, the movable heater support and the shield support are mounted on linear bearings and are moved smoothly along the rail.

FIG. 2 shows the patch clamp stop adjustment arm 43 swung outward in a disengaged position. The arm is moved vertically along a support 45, which is positioned on a vertical guide by a clamping knob 47. A scale 49 permits adjustment of the specific length.

As shown in FIG. 3, the stop support bracket 45 is mounted on a guide 51 connected to the left side of the mast 3.

The bracket includes a threaded adjustment block 53. Up and down movement of a movable plate 59 is controlled by the screw 61 which is turned by knob 63. Plate 59 is connected for axial movement with the screw. A downward extension 55, which contains an index 57, moves with the movable plate 59. A pin 65 in plate 59 mounts the arm 43 to swing out of position, as shown in FIG. 2, and into position, as shown in FIG. 3. A handle 67 is provided on an end of the arm 43. The contact sensor 69 is mounted on the arm 43, and wires 71 are connected to circuitry in the base 5.

The upper three-jaw chuck 73 is mounted on a turnable tightening housing 75 at the end of rigid tube 39. The three-jaw chuck is of the type used in a lathe.

A lower movable three-jaw chuck 77 with a hand tightening adjustment ring 79 is mounted on a movable chuck support 81, which is movable along rail 41 on linear bearings in a housing 83. Handles 85 laterally extend from the support 83. The handles may be unscrewed and removed, and weights may be screwed into the handle receiving sockets.

The heater assembly 90 is mounted on a heater support 105, which has linear bearings for moving along rail 41. An adjustment knob housing 92 is mounted on support 105.

The hot wire heater coil 87 is supported by screw threaded electrical connector posts 89 on removable mount 91, which is attached to a heater carrier 93. The heater carrier 93 is mounted on rods 95, which extend forward from a mounting plate 102. An adjustment knob housing 97 holds knobs 99 and 101. Knob 99 controls the inward and outward horizontal Y direction movement of the heater carrier 93 on the rods 95, which are attached to the mounting plate 102. Knob 101 controls adjustment in the lateral horizontal X direction by moving the intermediate mounting plate 102 on the V-slides 103 on the heater support 105, as shown in FIG. 4.

Shield support 107 moves on linear bearings along the rail 41, as controlled by handles 109, to position the generally cylindrical shield 111 in its upward position shown in FIGS. 1, 3 and 4, or in its downward shielding position, as shown in FIG. 2. The shield is held in open and closed positions by plungers.

FIG. 4 shows a right side view of the pipette puller, with the Z direction vertical adjustment for the coil locator assembly 100. Guide 113 is secured vertically to the mast 3. Scale 115 is positionable along the guide 113. Heater coil support 105, as shown in FIG. 3, slides on linear bearings along rails 41. Upper and lower locator assemblies 117 and 119 are individually repositionable along the guide 113 by loosening and tightening clamp knobs 121 and 123 respectively.

The heater support 105 indirectly carries a bracket 125 with locator engaging plunger assemblies, which slide up and down between the upper and lower locators on assemblies 117 and 119. The lower locator assembly 119 has a block 127 with an index 129 which cooperates with the scale 115 to indicate relative positions of the locators for the heater support.

A rack 131 is formed on the front of U-shaped guide 113, and m hand wheel 133 drives a pinion 135 (shown in FIG. 15) for moving the support 105 up and down along the guide 113 while the heater support is supported on linear bearings which engage rail 41.

In FIG. 4, weights 137 are shown mounted in place of the handles 85, as shown in FIG. 3.

In FIG. 2, arm 43 is shown swung away from its operative position beneath the movable chuck support 83, which is shown in FIG. 3 and 4.

FIG. 5 shows the guide 113 and rack 131, which are connected to the side of the mast. The U-shaped guide has cylindrical tracks or flanges 112 and 114, along which elements of the coil locator assembly 100 slide and clamp. Scale 115, as shown in FIG. 6, is supported between clamp block 201 shown in FIG. 7, and slide block 203 shown in FIG. 8. The clamp block has a clamp 205, which is engaged by knob 121 to fix the scale assembly as the notches 212 and 214 slide along the cylindrical flanges 112 and 114 of guide 113. The slide block 203 shown in FIG. 8 has similar notches but has no clamp.

A stop block 207 with a stop notch 209 and a flange-receiving groove 212 is connected to the scale 115 for selective positioning along the guide 113, as controlled by clamp 205 and knob 121. FIG. 9 shows a side elevation of the stop block 207, and FIG. 10 shows a bottom end view of the stop block.

A second lower stop block 211, with a flange-receiving groove similar to 212 and with a stop notch 213, is shown in FIG. 12.

FIG. 12 shows a clamp block 215, which is connected to the stop block 211 by screws 217.

FIG. 13 is a top view of the stop block 215 showing the clamp 217, which tightens groove 218 to clamp on the cylindrical flange 114. The clamp is controlled by the knob 123 so that the block may be repositioned along guide 113.

Mark 219 is aligned with one of the markings 221 on scale 115 to show the distance between the stop notches 209 and 213 on the stop blocks 207 and 211.

Figure 14:
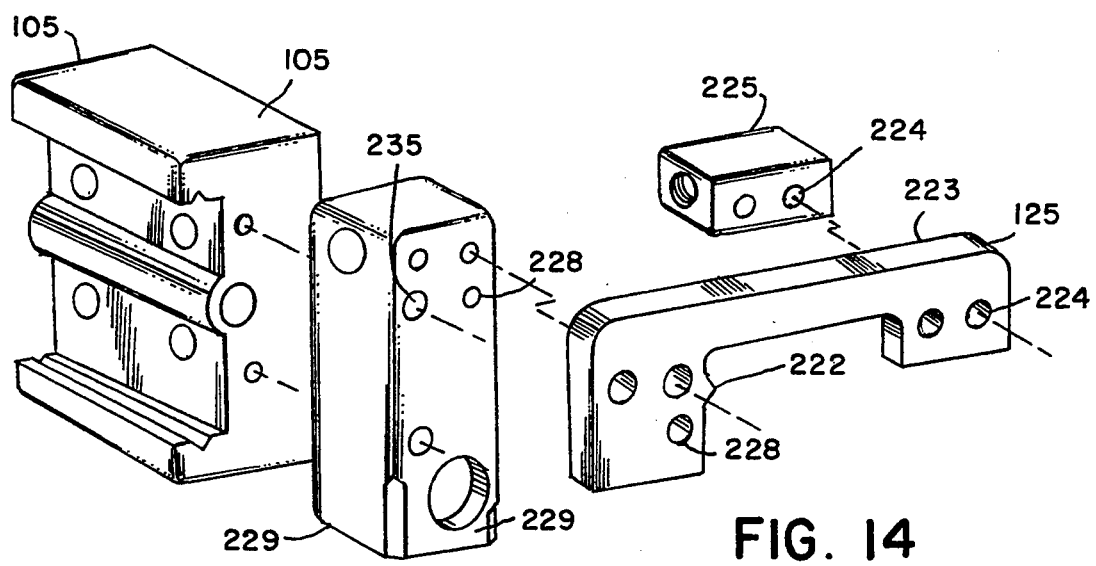
FIG. 14 is an exploded view of detent mountings.

As shown in FIG. 14, a pointer 222 is formed in a bracket 223, which extends over the scale between the detent blocks. The bracket 223 carries by complementary mounting holes 224 a plunger support 225, as shown in FIG. 11, and a spring loaded plunger 227, which engages the stop notch 213 in block 211. The pointer 222 cooperates with the scale 115.

The front of bracket 223 is connected to the gear housing 229 by fasteners in complementary holes 228, which supports the pinion gear 135 and control knob 133. A plunger 231 with a point 233 engages the stop notch 209 in block 207. As shown in FIGS. 14 and 15, mounting holes 235 receive screws for attaching the gear housing 229 to the coil adjusting support 105.

FIG. 16 is a side elevation detail of the gear 135 and knob 133 shown in FIG. 15.

The pointer 222 on bracket 223 is generally aligned with the plungers. The scale is adjusted vertically and is clamped in place by tightening knob 121, fixing the upper detent notch and the zero point of the scale 115. The mark 219 is moved along the scale and the second detent block is clamped in place by tightening knob 123, setting the distance between the two detent notches. The heater can then be moved up or down between the detents by turning the knob 133. When pointer 222 approaches an upper or lower limit, a plunger snaps into a detent notch.

A patch clamp stop assembly is shown in FIGS. 17 through 20.

FIG. 17 is an exploded side elevation of a guide plate 241 and guide rail, and FIG. 18 is a bottom end view of the guide plate and guide rail 241, which are attached to a left side of the mast. The cylindrical guide rails 243 are attached to the guide plate with mounting screws 245.

A scale bracket block 45 with a guide slot 247 slides along the rail and is held in place by a clamp block 249 with a clamp controlling knob 47, as shown in the exploded view of FIG. 19. Screws 248 connect the blocks 45 and 249. The block 45 has an extension 251, which is threaded to receive the adjusting screw 61. The upper end of the adjustment screw 61 is connected to the knob 63 with a set screw to move a carrier plate 59 up and down. Bearings, a spacer, a washer and a nut generally indicated as 252 allow the plate 59 to rotate on screw 61.

A tick plate 253 with a mark 255 is connected to the carrier plate 59. The mark 255 cooperates with the scale 49 to show the relative position of the carrier plate by complementary fastener-receiving holes 254.

The carrier plate supports swingable arm 43, as shown in the exploded view in FIG. 20. Threads 257 on a carrier pin 259 engage a threaded opening 261 in the carrier plate to support the arm 43. The contact sensor 69 and sensor wires 71 are supported on the outer end of the arm 257, and the handle 67 swings the arm out of position and into position beneath the lower chuck support 81.

While the invention has been described with reference to specific embodiments, modifications and variations of the invention may be constructed without departing from the scope of the invention, which is defined in the following claims.

I claim:

1. A pipette puller comprising a base and a vertical mast, an upper cantilevered support forward from the top of the vertical mast, an upper three-jaw chuck connected to the forward cantilevered support, a rail vertically connected to the mast, a movable chuck support connected to the rail and slidable along the rail, a movable three-jaw chuck connected to the movable chuck support in axial alignment with the upper chuck, weight supports on the movable chuck support for receiving variable weights, a stop bracket connected to the mast beneath the movable chuck support, a stop adjuster screw connected to the stop bracket and a stop plate connected to the stop adjuster screw and a stop support swingable outward from a stop plate away from and beneath the movable chuck support for stopping downward movement of the movable chuck support, a heater guide connected to the mast, a heater support mounted on the rail and connected to the heater guide for vertical positioning along the heater guide, a first vertical heater adjustment connected to the mast and the heater support for adjusting vertical position of the heater support, a heater carrier connected to the heater support, an X adjustment connected between the heater carrier and the heater support for moving the heater carrier laterally with respect to the heater support, a Y adjustment connected between the heater support and the heater carrier for moving the heater carrier horizontally toward and away from the heater support, a heater wire connected to the heater carrier and aligned axially with the upper and movable three-jaw chucks, a slide mounted on the rail and a partially cylindrical shield connected to the slide for moving upward and downward along the rail for uncovering and covering the heater wire and the upper chuck.

2. The pipette puller of claim 1, wherein the swingable stop support has a handle extending from the stop support, and wherein the stop support is mounted on a trunnion on the stop plate for swinging into position beneath the movable chuck support and out of position at a side of the mast for allowing the movable chuck to slide toward a bottom of the rail.

3. The pipette puller of claim 1, wherein the base comprises a process controller with a power switch for turning power on and off, a first heat adjuster for adjusting a first heat, a second heat adjuster for adjusting a second heat, a display for displaying a heat index of a heat selected, a selector for selecting the display of the first heat or the second heat, and status indicator lights for indicating power on, system ready, pulling, reposition, pull complete, and shield open.

4. The pipette puller of claim 2, further comprising a contact sensor switch on the stop support for sensing contact of the movable chuck support with the stop support.

5. The pipette puller of claim 1, further comprising an adjustment plate positioned between the heater support and the heater carrier, and slides connected to the heater carrier and the adjustment plate for sliding the heater carrier toward and away from the adjustment plate upon adjustment.

6. The pipette puller of claim 5, further comprising slides connected between the heater support and the adjustment plate for sliding the adjustment plate laterally with respect to the heater support.

7. The pipette puller of claim 1, further comprising a removable mount connected between the heater wire and the carrier and supporting the heater wire and removable from the carrier for interchanging heater wires and mounts without touching heater wires.

8. The pipette puller of claim 1, further comprising upper and lower adjustable limits mounted on the mast, a vertical rack mounted on the mast, and a pinion connected to the rack and a turnable handle connected to the pinion and to the heater support for moving the heater support and the heater wire along the rack between the upper and lower limits.

9. A pipette puller comprising a base and a vertical tower, an upper cantilevered support forward from the top of the vertical tower, an upper chuck connected to the forward cantilevered support, a rail vertically connected to the tower, a movable chuck slidable along the rail, in axial alignment with the upper chuck, a stop bracket connected to the tower beneath the movable chuck support, a stop adjuster connected to the stop bracket and a stop plate connected to the stop adjuster and a stop support swingable outward from the stop plate away from and beneath the movable chuck for stopping downward movement of the movable chuck, a heater support slidable on the rail and connected to the heater, a first vertical heater adjustment connected to the tower and the heater support, a heater carrier connected to the heater support, a lateral adjuster connected between the heater carrier and the heater support, an in and out adjuster connected between the heater support and the heater carrier, a heater wire connected to the heater carrier and aligned axially with the upper and movable chucks, a shield slide mounted on the rail and a shield mounted on the slide for moving along the rail for uncovering and covering the heater wire.

10. The pipette puller of claim 9, wherein the stop support is mounted on a trunnion on the stop plate for swinging into position beneath the movable chuck and out of position at a side of the tower for allowing the movable chuck to slide on the rail.

11. The pipette puller of claim 9, wherein the base has a power switch, a first heat adjuster, a second heat adjuster, a selector for selecting the first or second heat adjuster, display for displaying a heat index of the selected heat adjuster, and status indicator lights for indicating power on, system ready, pulling, reposition, pull complete, and shield open.

12. The pipette puller of claim 9, further comprising a contact sensor switch on the stop support for sensing contact of the movable chuck with the stop support.

13. The pipette puller of claim 9, further comprising an adjustment plate positioned between the heater support and the heater carrier, and rods connected to the heater carrier and adjustment plate for sliding the heater carrier toward and away from the adjustment plate.

14. The pipette puller of claim 13, further comprising tracks between the heater support and the adjustment plate for sliding the adjustment plate laterally with respect to the heater support.

15. The pipette puller of claim 9, further comprising a bayonet coupling connected between the heater wire and the carrier and supporting the heater wire and removable from the carrier for interchanging heater wires and couplings without touching heater wires.

16. The pipette puller of claim 9, further comprising upper and lower adjustable limits mounted on the tower, a vertical rack mounted on the tower, and a pinion connected to the rack and a turnable handle connected to the pinion and to the heater support for moving the heater support between the upper and lower limits.

17. A pipette puller comprising a base and a vertical tower, an upper cantilevered support forward from the top of the vertical tower, an upper chuck connected to the forward cantilevered support, a rail vertically connected to the tower, a movable chuck slidable along the rail in axial alignment with the upper chuck, a heater coil support movable vertically between the chucks, an auxiliary track mounted along the tower, a scale relocatable along the track, a first detent connected to the scale, a second detent relocatable along the track and a mark connected to the second detent for cooperating with the scale to show distance between the first and second detents, a gear housing connected to the heater coil support and movable along the track by turning a knob and turning a pinion gear in the gear housing, third and fourth detents connected to the gear housing for cooperating respectively with the first and second detents to stop movement of the gear housing when the first and third or the second and fourth detents mutually engage.

18. The pipette puller of claim 17, wherein the first and second detents are notches, and wherein the third and fourth detents are plungers.

19. The pipette puller of claim 18, wherein the plungers are horizontally opposed.

* * * * *